H. W. FELLOWS.
POWER LIFT MECHANISM FOR PLOWS.
APPLICATION FILED JUNE 2, 1914.

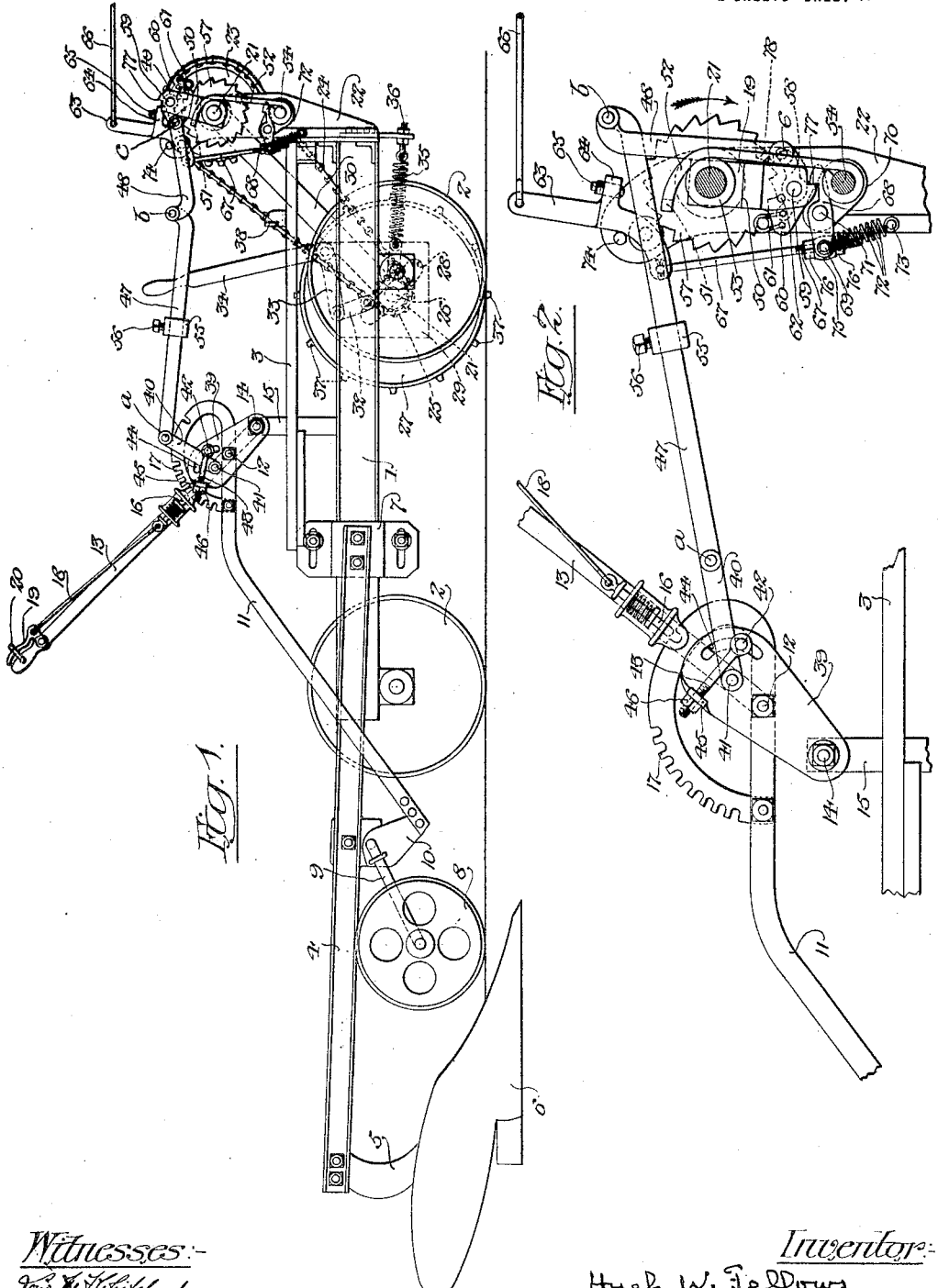

1,319,467.

Patented Oct. 21, 1919.
2 SHEETS—SHEET 2.

Witnesses:

Inventor:-
Hugh W. Fellows
by Peirce, Fisher & Clapp
Attys.

UNITED STATES PATENT OFFICE.

HUGH W. FELLOWS, OF LOS ANGELES, CALIFORNIA, ASSIGNOR TO J. I. CASE THRESHING MACHINE COMPANY, OF RACINE, WISCONSIN, A CORPORATION.

POWER LIFT MECHANISM FOR PLOWS.

1,319,467. Specification of Letters Patent. Patented Oct. 21, 1919.

Original application filed April 7, 1913, Serial No. 759,488. Divided and this application filed June 2, 1914. Serial No. 842,389.

*To all whom it may concern:*

Be it known that I, HUGH W. FELLOWS, a citizen of the United States, and a resident of Los Angeles, county of Los Angeles, and State of California, have invented certain new and useful Improvements in Power Lift Mechanism for Plows, of which the following is a full, clear, and exact description.

The present application is a division of an application filed by me April 7, 1913, Serial No. 759,488.

The invention relates to power lift mechanism for plows and seeks to provide simple and effective mechanism for this purpose. The invention consists in the features of improvement hereinafter set forth, illustrated in the preferred form in the accompanying drawings and more particularly pointed out in the appended claims.

Figure 3:
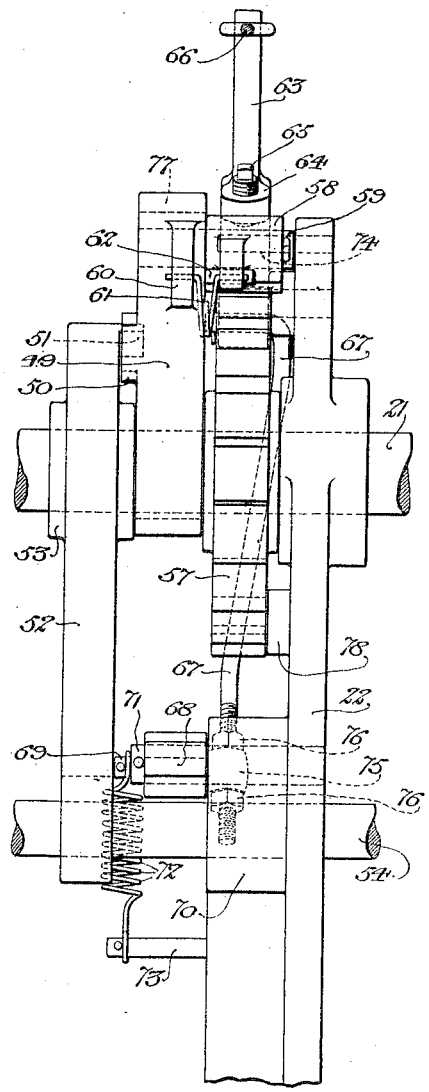
Figure 4:
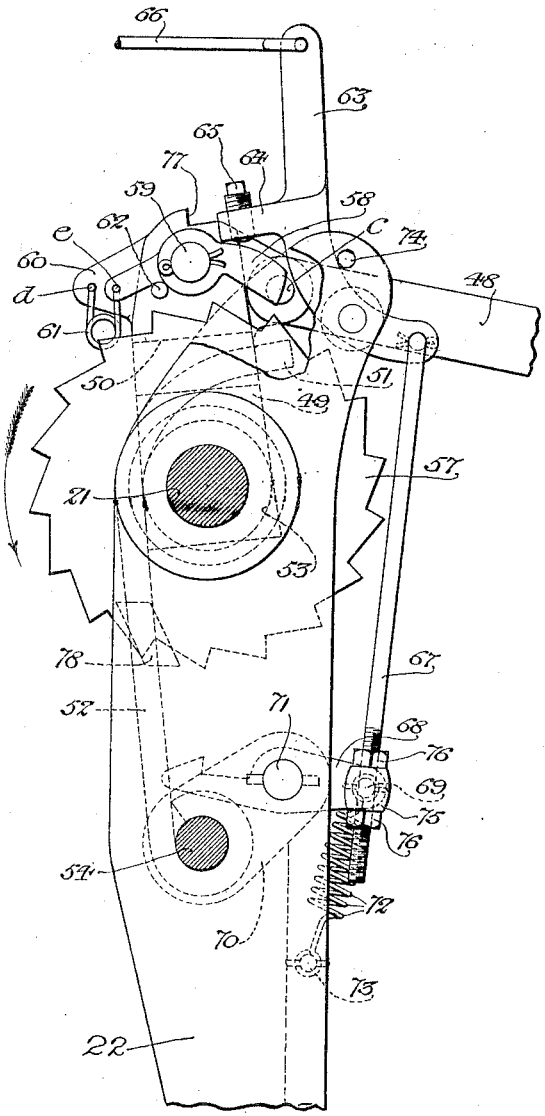

In the drawings, Figure 1 is a view in elevation of a plow with the present improved lift mechanism applied thereto. Fig. 2 is an enlarged detail view of the lift mechanism with the parts in raised position. Fig. 3 is an enlarged detailed front elevation of parts of the lift mechanism. Fig. 4 is a side elevation of the parts shown in Fig. 3.

The present invention is particularly adapted to raise and lower the individual plows of a gang plow in which the separate plows of the gang are individually connected to a suitable draft frame. In the drawings but a single lift mechanism is illustrated but the parts may be duplicated for raising and lowering the other plows.

The draft frame 1 is mounted upon suitable supporting wheels 2 and is surmounted by a platform 3. The plow beam 4 is provided with a standard 5 at its rear end, which carries the plow body 6. At its forward end the beam 4 is connected by a suitable coupling 7 to the draft frame so that the plow may be raised and lowered. A gage wheel 8 is mounted upon the end of an arm 9 that is pivotally connected at its upper end to the plow beam. The supporting arm 9 of the gage wheel is provided at its upper end with a forwardly and downwardly projecting arm 10 which is pivotally connected to the rear end of a link 11. The link extends upwardly and forwardly and its forward end is connected by a pivot bolt 12 to a shift lever 13. The lever 13 connected by a pivot bolt 14 to a standard 15 which rises from the draft frame 1 and the lever is preferably adapted to be operated by hand. It is provided with the usual locking dog 16 which coöperates with a segment 17 formed upon the forward end of the link 11. The dog 16 is connected by a rod 18 to a pivoted trip 19 on the outer end of the lever 13 and a latch 20 on the end of the lever is arranged to engage the trip to hold the dog in released position.

A power shaft 21 extends across and above the front portion of the draft frame and is journaled, as shown, in brackets 22 which are fixed to and project upwardly from the draft frame. This shaft is continuously driven from a suitable ground wheel. In the construction shown, the shaft is provided at one end with a sprocket wheel 23. A chain 24 passes over this sprocket wheel and over a sprocket wheel 25 that is mounted on the shaft 26 of the ground wheel 27. The shaft 26 is short and its end is guided within a segmental slot 28 formed in a plate 29 that is securely bolted to one of the members of the draft frame 1. The guide slot 28 is concentric with the power shaft 21 and a brace 30 extends between the power shaft and the shaft 26 of the ground wheel. The bearing for the ground wheel is connected by a link 32 to the short arm 33 of the bell crank lever which is pivotally mounted on the plate 29. The other arm 34 of the bell crank extends upwardly and forms a hand lever by which the ground wheel 27 can be raised and lowered. A spring 35 is connected at its rear end to the bearing of the ground wheel and at its forward end to the frame and serves to hold the wheel 27 in engagement with the ground. The forward end of the spring is preferably connected to the frame by an adjusting bolt 36. In order that the wheel 27 shall securely engage the surface of the ground and be rotated as the plow is drawn forwardly, its periphery is provided with ribs 37. By means of the hand lever 34, the wheel 27 may be raised against the tension of the spring 35 out of engagement with the ground and, by engaging the lever 34 with the lug 38 on the edge of the platform 2, the ground wheel may be held in raised position.

The power shaft 21 is arranged to operate a series of separate or individual lift mechanisms, one for each of the plows, each of these lift mechanisms being of similar construction. The pivot bolts 12 and 14 which connect the shift lever 13 to the link 11 and standard 15, respectively, also serve to fasten a plate 39 to the lower end of the lever, the plate 39 and lever 13 being arranged on opposite sides of the link 11 which connects the lever to the gage wheel of the plow. A short link 40 is connected at its lower rear end by a pivot pin 41 to the plate 39 and lever 13. This link extends upwardly and forwardly and bears upon a cross pin 42 which is mounted in the end of an adjusting bolt 43. The pin 42 also extends through a segmental slot 44 which is formed in the plate 39 concentric with the pivot pin 41. The opposite end of the bolt 43 extends through an ear 45 on the plate 39 and an adjusting nut 46 is threaded on the bolt into engagement with the ear 45. By adjusting the nut, the position of the pin 42 and link 40, relatively to the shift lever 13, can be adjusted. The upper forward end of the link 40 is connected to the rear end of a link 47 and the forward end of the latter is connected to the rear end of a link 48. The link 48 is pivotally connected to the upper end of an arm 49 which is loosely mounted on the power shaft 21. The arm 49 is provided on its rear side with a laterally projecting lug 50 which is adapted to engage a stop lug 51 on the upper end of a strap 52. The upper end portion of this strap is bent rearwardly around a collar 53 on the shaft 21 and its lower end is bent around and fixed to a transverse rod 54 which is supported by the brackets 22.

When the power lift mechanism is used, the dog 16 on the hand shift lever 13 is maintained out of engagement with the notches of the segment 17 by means of the latch 20. The position of the arm 49 against the stop lug 51 then determines the working depth of the plow, since it is connected to the gage wheel thereof through the medium of the link 11, shift lever 13 and connecting links 40, 47 and 48. The position of the link 40 relative to the shift lever can be adjusted by the bolt 43 to thereby regulate the working depth of the plow. The links 40, 47 and 48 form a flexible connection between the shift lever and the arm 49 so that the lever can be operated by hand, if desired, to raise and lower the plow, and this flexible connection also permits the upward movement of the plow in case it strikes an obstruction. Under ordinary working conditions, pivot points $a$, $b$ and $c$ of links 47 and 48 are in line because of the pull of the plow thereon but, as the plow rises on striking an obstruction or is raised by the handle 13, the links 47 and 48 are free to swing downwardly about the pivots $a$ and $c$. It is essential to the proper operation of the power lift mechanism that the arm 49 be maintained in engagement with the stop lug 50 when the plow is in working position and, for this purpose, a weight 55 is fastened to the link 47 by means of a set screw 56 and serves to take up any slack in the flexible connection between the arm 49 and the shift lever 13 and also serves to maintain the arm 49 in engagement with the stop lug 51 when the plow is in working position.

The arm 49 is coupled to the power shaft 21 and raises the plow by means of a pawl and ratchet clutch, the preferred form of which is set forth in detail in Figs. 3 and 4. The ratchet 57 of the clutch is fixed to the shaft 21 and rotates therewith. A clutch dog or pawl 58 is connected by a pivot pin 59 to the upper end of the arm 49 and the tail of the clutch dog or pawl is connected to a lug 60 on the upper end of the arm by means of a U-shaped spring 61. The legs of the spring pivotally engage the lug and the tail of the dog at points $d$ and $e$, respectively, and, as the dog is shifted on the pivot pin 59, the point $e$ shifts from one side to the other of a line extending between the axis of the pivot pin and the point $d$, so that the spring 61 acts to hold the clutch dog or pawl in engagement with the ratchet 57 or in its disengaged position. In the latter position, as shown in Fig. 4, the tail of the dog engages a stop pin 62 on the side of the arm 49.

A trip 63 is pivotally mounted on the upper end of the adjacent bracket 22 and is provided with a projecting lug 64 having a stud 65 adjustably threaded therethrough. This stud is arranged to engage the dog 58 when the trip is shifted, to thereby move the clutch dog into engagement with the ratchet wheel. The trip 63 is adapted to be shifted by hand and, when the plow is drawn by a traction engine, a cord or chain 66 is connected to the upper end of the trip and extends forwardly to the platform of the traction engine.

The lower rearwardly curved end of the trip is connected to the upper end of a link 67 and the lower end of the latter is connected to a tail of a locking dog 68 by a pivot pin 69. The locking dog 68 is pivotally mounted upon a boss 70 on the side of the adjacent bracket 22 by means of a pivot pin 71, and a spring 72 extends between the pin 69 and a pin 73 on the bracket. This spring holds the locking dog 68 and the trip 63 in normal position with the latter in engagement with a suitable stop 74 on the upper end of the bracket. The link 67 is preferably adjustably connected to the pin 69 and for this reason it extends loosely through a head 75 on one end of the pin, as shown in Fig. 3, and nuts 76 threaded on the rod on opposite sides of the head adjustably connect the rod or link to the pin. The upper end of the arm 49 is provided with a nose 77 which is arranged to coöperate with the locking dog 68 to hold the plow in raised position. The bracket 22 is provided with a laterally projecting lug 78 which is arranged to engage the clutch dog 58 and disengage it from the ratchet 57.

In Figs. 1, 3 and 4, the parts are shown in the position assumed when the plow is working in the ground. To raise the plow, the trip 63 is shifted to force the clutch dog 58 into engagement with the ratchet wheel, which rotates continuously with the power shaft 21 in the direction indicated by the arrows in Figs. 2 and 4. The arm 49 is then rotated a half revolution and, through the medium of the connections described, raises the plow. During the first part of the movement of the arm 49, the effective length of the crank by which the power is applied to the flexible connection between the arm and the plow, is equal to the distance between the shaft 21 and the pivot pin $c$. After the arm is moved about one-quarter of a revolution, the link 48 engages the side of the arm 49 and the pin $b$ then acts as a crank pin to apply the pull to the shift lever 13 through the medium of the links 47 and 40. During the latter part of the movement, therefore, of the arm 49, the length of the crank by which the power is applied to the lift mechanism is increased. In this way the plow is started slowly from the ground but is quickly lifted as it leaves the ground.

At the end of a half revolution, the clutch dog 58 strikes the lug 78 and is disengaged from the wheel. The parts are so arranged that just before the dog is disengaged, the lug or nose 77 on the upper end of the arm 49 engages the locking dog 68, as shown in Fig. 2, so that the plow is held in raised position.

To lower the plow, the trip 63 is again shifted and, through the medium of the link 67, the locking dog 68 is disengaged from the end of the arm 49 and the plow then falls by gravity to working position. During this lowering movement, the arm swings a half revolution in the direction opposite to that indicated by the arrows in Figs. 2 and 4. At the end of this movement, the arm 49 engages and is arrested by the stop lug 51 and, as above stated, while the plow is in working position, the arm 49 is always held by the weight 55 in engagement with the stop lug so that it is always in proper position to be connected to the power shaft by the pawl and ratchet clutch to raise the plow.

The adjacent ends of the links 47 and 48 are upwardly curved, as shown, so that a long leverage for quickly lifting the plow after the latter leaves the ground, is provided. It should be noted that the trip 63 not only serves to engage the clutch dog of the ratchet to raise the plow, but also, through the connecting link 67, serves to disengage the spring held locking dog 68 to thereby effect the lowering movement of the plow.

It is obvious that numerous changes may be made in the details set forth without departure from the essentials of the invention as defined in the claims.

I claim as my invention:—

1. In a power lift for plows, the combination with a plow, of lifting connections therefor including a member arranged to oscillate back and forth as the plow is raised and lowered, a power shaft whereon said member is loosely mounted, a clutch for connecting said member to said shaft, a clutch device, a manually operable trip for throwing said clutch device into operation, means independent of said trip for maintaining said clutch device in operative position, means for automatically disengaging said clutch device and means for automatically locking said lifting connections with the plow in raised position.

2. In a power lift for plows, the combination with the plow, of a power shaft, a member loosely mounted on said power shaft, a ratchet wheel fixed to said shaft, a clutch dog pivoted on said member to move into and out of engagement with said ratchet wheel, a spring for holding said dog in its engaged and disengaged positions, a stop lug for disengaging said dog, a locking pawl for engaging said member to hold the plow in raised position, a trip for throwing said clutch dog to engaged position, and a connection between said trip and said locking pawl for disengaging the latter.

3. In a power lift for plows, the combination with the plow, of a power shaft, a member loosely mounted on said shaft and connected to the plow, a clutch for connecting said member to said shaft to thereby raise the plow, means for disengaging said clutch, a locking pawl for engaging said member to hold the plow in raised position, and a member for throwing the clutch into operation or for releasing said locking pawl.

4. In a power lift for plows, the combination with a frame and a plow connected thereto, of a power shaft on said frame, a spring held ground wheel geared to said power shaft, means for raising and lowering said ground wheel, a power lift mechanism operated by the shaft.

5. In a power lift for plows, the combination with a shaft, a member loosely mounted on said shaft, a flexible connection between said member and said plow, a stop device normally engaging said member, means for positively holding said member in engagement with said stop device and a clutch for connecting said member to said shaft to raise the plow.

6. In a power lift for plows, the combination of a plow, of a power driven shaft, a member loosely mounted on said shaft, a flexible link connection between said member and said plow, a stop normally engaged by said member, a weight on one of the links of said connection for holding said member in engagement with said stop, and a clutch for coupling said member to said shaft to raise the plow.

7. In a power lift for plows, the combination with a plow, of a hand lever connected to said plow, a power operated shaft, a member loosely mounted on said shaft, a flexible connection between said member and said hand lever, a stop normally engaged by said member to hold the plow in working position, and a clutch for connecting said member to said shaft to raise the plow.

8. In a power lift for plows, the combination of a plow, of a hand lever connected to said plow, of a shaft, a member loosely mounted on said shaft, a flexible link connection between said member and said lever, a stop normally engaged by said member to hold the plow in working position, a weight on one of the links of said connection for holding said member in engagement with said stop, means for adjusting the position of one of the links of said connection to regulate the working depth of the plow, and a clutch for connecting said member to said shaft to raise the plow.

HUGH W. FELLOWS.

Witnesses:
J. G. ANDERSON,
J. H. PEIRCE.

Copies of this patent may be obtained for five cents each, by addressing the "Commissioner of Patents, Washington, D. C."